May 20, 1958
T. V. HEALY
2,835,555
REDUCTION OF ACIDITY OF NITRIC ACID SOLUTIONS
BY USE OF FORMALDEHYDE
Filed Nov. 17, 1954
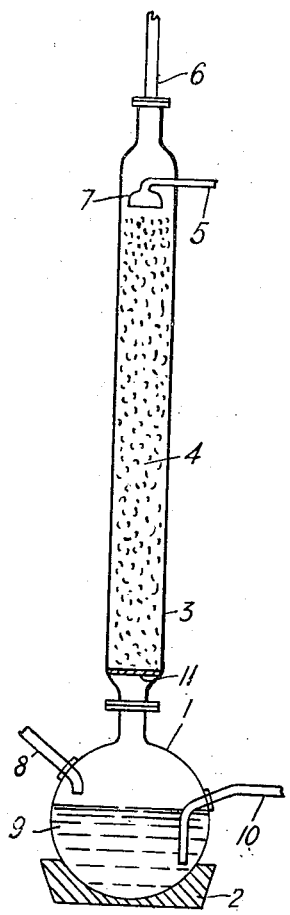
Inventor
THOMAS VICTOR HEALY
By Robert B Larson
Attorney

United States Patent Office 2,835,555
Patented May 20, 1958

2,835,555

REDUCTION OF ACIDITY OF NITRIC ACID SOLUTIONS BY USE OF FORMALDEHYDE

Thomas Victor Healy, Harwell, England, assignor, by mesne assignments, to the United States of America as represented by the United States Atomic Energy Commission Application November 17, 1954, Serial No. 469,354

7 Claims. (Cl. 23—102)

This invention relates to the reduction of the acidity of aqueous solutions and is particularly concerned with treatment of aqueous solutions containing nitric acid to bring about controlled decomposition of the acid.

In the processing of aqueous nitric acid solutions of chemical substances, particularly fission products, wherein reduction of the bulk of the solutions by evaporation is carried out, the concentration of the nitric acid that will result may be inconvenient and/or undesirable. It is known (Ber., vol. 32, 1932 (1899)) that formaldehyde decomposes nitric acid with the formation of gaseous products and water. The addition of formaldehyde to such nitric acid solution during reduction of the bulk by evaporation would therefore be suitable for reducing the acid concentration.

The present invention is based on the observation that with solutions containing nitric acid of concentration above about 8 N the following reactions take place with formaldehyde:

(1) 
$$3CH_2O + 4HNO_3 \rightarrow 4NO + 3CO_2 + 5H_2O$$

(2) 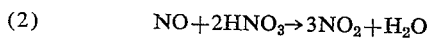
$$NO + 2HNO_3 \rightarrow 3NO_2 + H_2O$$

whereas with solutions containing nitric acid below about 8 N only the first reaction only takes place but the nitric oxide evolved is capable of decomposing the more concentrated acid above about 8 N.

Accordingly, the invention comprises treating heated aqueous solutions of metal salts containing nitric acid at a concentration below about 8 N with formaldehyde, and passing the nitric oxide formed into contact with aqueous solution containing nitric acid above about 8 N to bring about decomposition of the acid.

Thus by employment of the process of the invention, the formaldehyde may be employed more economically to reduce the concentration of nitric acid in aqueous solutions to low values.

The invention also consists in a method of concentrating by evaporation an aqueous solution of metal salts containing nitric acid in amount not exceeding 8 N, which comprises passing formaldehyde into a body of the heated solution to bring about decomposition of nitric acid with evolution of nitric oxide, causing the evolved nitric oxide to pass into counter current with further aqueous solution, which may be heated, of the metal salts containing nitric acid in amount greater than 8 N to bring about decomposition of nitric acid and reduce the normality to below 8 N and passing the resulting solution into the body of heated solution and withdrawing solution of reduced nitric acid content from the body of solution.

The formaldehyde may be used in gaseous form or as an aqueous solution, conveniently the commerically available 35 to 40 percent solution, or as paraformaldehyde.

For carrying out the invention in a continuous manner there may be employed a vessel serving as a boiler and provided with an inlet for formaldehyde, an outlet for removing solution of low acid content and a gas and vapour outlet leading to a vertical packed column to the top of which solution to be treated may be fed.

Initially aqueous solution of chemical substances less than 8 N in nitric acid may be introduced into the boiler and the temperature raised to the boiling point. Formaldehyde, preferably in the form of a 35 to 40 percent aqueous solution, may then be introduced to bring about the decomposition of nitric acid according to equation above. A flow of aqueous solution containing nitric acid above 8 N into the top of the packed column is started, the rate of flow being maintained in proportion to the nitric oxide from the solution in the boiler. The solution fed to the top of the column may be obtained as a result of the concentration of nitric acid-containing aqueous solutions by evaporation.

The concentration of nitric acid in the solution descending the column will decrease by reaction with the nitric oxide evolved in the boiler and will undergo further decrease in the boiler. Solution of the chemical substances of low nitric acid content may be withdrawn from the vessel continuously and subjected to concentration by evaporation.

In this way a reduction of the nitric acid concentration from 15 N to 0.25 N may be effected.

The following is a preferred way of carrying the invention into effect, as applied by way of example to an aqueous solution which has resulted from dissolving neutron-irradiated uranium in nitric acid and separating the majority of the uranium and plutonium, the solution containing fission products nitric acid and low concentrations of added electrolytes, reference being made to the accompanying drawing which shows in vertical cross section a form of apparatus which may be employed.

The boiler 1, which may be of stainless steel or other corrosion resistant substance, is arranged on an electrical heater unit 2 and is provided with pipes 8 and 10 for the admission of formaldehyde and the withdrawal of nitric acid respectively. The neck of boiler 1 is attached to a vertical column 3 which is packed with ceramic packing 4 or other packing resistant to nitric acid, the column having a sprayer 7 attached to pipe 5 through which nitric acid is introduced. The upper end of the column is connected to a pipe 6 through which gases generated in the apparatus may be discharged. At the lower end of the column a grid 11 supports the packing 4.

The aqueous solution, 8 N in nitric acid and containing fission products introduced into the apparatus by way of pipe 6 and when an appropriate amount of the solution 9 has collected in the boiler 1, the electrical heater 2 is energized to bring the solution to the boiling point. A 40 percent aqueous solution of formaldehyde is run into the boiler by way of the pipe 8. Further aqueous solution about 15 N in nitric acid and containing fission products is passed into the apparatus by way of pipe 5 and the sprayer 7. Nitric oxide evolved in the boiler 1 passing up the column 3 in counter current flow to the aqueous solution reacts with the nitric acid in accordance with Equation 2 above, reducing the concentration of acid. The solution entering the boiler 1 from the column will undergo a further reduction in nitric acid content in boiler 1 and solution containing 0.25 N nitric acid is withdrawn by way of the pipe 10. The latter solution may be subjected to concentration by evaporation to raise the normality in nitric acid to 15 N, and the concentrated solution again introduced into the apparatus for further reduction of the nitric acid content. In this manner the concentration of the dissolved substances may be increased fifty fold while the nitric acid may be reduced to 0.25 N.

I claim:

1. A continuous method of concentrating by evaporation an aqueous solution of metal salts containing nitric acid in amount not exceeding 8 N, which comprises heating the solution, passing formaldehyde into the heated solution to bring about decomposition of nitric acid with evolution of nitric oxide, counter-currently contacting a further aqueous solution of the metal salts containing nitric acid in amount greater than 8 N with said evolved nitric oxide to bring about decomposition of nitric acid and reduce the normality to below 8 N and passing the resultant solution into the body of heated solution and withdrawing therefrom aqueous solution with a nitric acid content less than that of the starting solution.

2. A continuous method of concentrating by evaporation an aqueous solution of metal salts containing nitric acid in amount not exceeding 8 N which comprises treating the solution, passing formaldehyde into the heated solution to bring about decomposition of nitric acid with evolution of nitric oxide counter-currently contacting, a stream of further aqueous solution of the metal salts containing nitric acid in amount greater than 8 N with said evolved nitric oxide to bring about decomposition of nitric acid and reduce the normality to below 8 N in nitric acid, passing the stream of further aqueous solution into the body of heated solution and withdrawing therefrom aqueous solution with a nitric acid content less than that of the starting solution.

3. A continuous method according to claim 2 wherein the aqueous solution is further concentrated by evaporation.

4. A continuous method according to claim 2 wherein the formaldehyde is employed in the form of a formaldehyde polymer.

5. A continuous method according to claim 2 wherein the formaldehyde is employed in the form of paraformaldehyde.

6. A continuous method of concentrating by evaporation an aqueous solution of metal salts containing nitric acid at a concentration not exceeding 8 N wherein the solution is heated and is then treated with formaldehyde to decompose nitric acid with evolution of nitric oxide and passing the nitric oxide evolved into contact with further aqueous solution of the metal salts containing nitric acid in excess of 8 N.

7. The step in the concentration of an aqueous solution of metal salts containing nitric acid of normality exceeding 8 N which comprises passing the solution in counter-current relationship with nitric oxide evolved by reaction between formaldehyde and a nitric acid aqueous solution of the metal salts which is not greater than 8 N in nitric acid.

References Cited in the file of this patent

UNITED STATES PATENTS 887,266     Pauling _____ May 12, 1908

FOREIGN PATENTS 43,305     Holland _____ June 15, 1938

OTHER REFERENCES

Mellor: Comprehensive Treatise of Inorganic and Theoretical Chemistry, vol. 8, pages 435, 589 (1928), pub. by Longmans, Green & Co., London.